US010502286B2

United States Patent
Kwon et al.

(10) Patent No.: US 10,502,286 B2
(45) Date of Patent: Dec. 10, 2019

(54) MULTI-STAGE TRANSMISSION FOR VEHICLE

(71) Applicants: HYUNDAI MOTOR COMPANY, Seoul (KR); KIA Motors Corporation, Seoul (KR)

(72) Inventors: Hyun Sik Kwon, Seoul (KR); Seong Wook Ji, Gunpo-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 228 days.

(21) Appl. No.: 15/822,782

(22) Filed: Nov. 27, 2017

(65) Prior Publication Data

US 2019/0078652 A1    Mar. 14, 2019

(30) Foreign Application Priority Data

Sep. 11, 2017  (KR) .................. 10-2017-0115973

(51) Int. Cl.
*F16H 3/66*    (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC .............. F16H 3/66; F16H 2200/0069; F16H 2200/2012; F16H 2200/2046; F16H 2200/0052; F16H 2200/2017
See application file for complete search history.

(56) References Cited

U.S. PATENT DOCUMENTS

| 6,176,803 B1 * | 1/2001 | Meyer | F16H 3/666 475/276 |
| 2015/0111690 A1 * | 4/2015 | Shim | F16H 3/66 475/280 |
| 2015/0267786 A1 | 9/2015 | Hart | |

* cited by examiner

*Primary Examiner* — Jeffrey A Shapiro
(74) *Attorney, Agent, or Firm* — McDonnell Boehnen Hulbert & Berghoff LLP

(57) ABSTRACT

Disclosed is a multi-stage transmission for a vehicle. The multi-stage transmission includes: an input shaft, an output shaft, and a first planetary gear set, a second planetary gear set, a third planetary gear set, and a fourth planetary gear set provided between the input shaft and the output shaft to transfer a torque. Each planetary gear set includes three rotating elements and six shifting elements connected to the rotating elements of the first, second, third and fourth planetary gear sets. A first rotating element of the first planetary gear set is fixedly connected to a first rotating element of the second planetary gear set. The second rotating element thereof is fixedly connected to a first rotating element of the third planetary gear set. A third rotating element thereof is fixedly connected to a third rotating element of the fourth planetary gear set.

6 Claims, 2 Drawing Sheets

FIG. 2

| GEAR STEP | CL1 | CL2 | B1 | B2 | CL3 | CL4 | GEAR RATIO |
|---|---|---|---|---|---|---|---|
| 1ST | ● | | | ● | | ● | 5.400 |
| 2ND | | ● | | ● | | ● | 3.000 |
| 3RD | ● | ● | | ● | | | 2.579 |
| 4TH | | ● | ● | ● | | | 2.016 |
| 5TH | | ● | | ● | ● | | 1.770 |
| 6TH | | ● | ● | | ● | | 1.200 |
| 7TH | | ● | | | ● | ● | 1.000 |
| 8TH | | ● | ● | | | ● | 0.808 |
| 9TH | ● | ● | ● | | | | 0.714 |
| 10TH | ● | | ● | | | ● | 0.577 |
| REV | ● | | | ● | ● | | −2.850 |

MULTI-STAGE TRANSMISSION FOR VEHICLE

CROSS REFERENCE TO RELATED APPLICATION

The present application claims priority to Korean Patent Application No. 10-2017-0115973, filed Sep. 11, 2017, the entire contents of which is incorporated herein for all purposes by this reference.

BACKGROUND OF THE DISCLOSURE

Field of the Disclosure

The present disclosure relates generally to a multi-stage transmission for a vehicle. More particularly, the present disclosure relates to a technology capable of improving fuel efficiency of a vehicle by implementing as many shifting stages as possible with as few components as possible and in as straightforward a configuration as possible.

Description of the Related Art

Recently, a rise in oil prices has become a factor pushing automobile manufacturers throughout the world to enter into unlimited competition to improve fuel efficiency. In the case of an engine, efforts to improve fuel efficiency and decrease weight thereof through novel technology enabling downsizing, or the like, have been taken.

Meanwhile, among methods of improving fuel efficiency that are realized by a transmission mounted in a vehicle, there is a method of allowing an engine to be driven at a more efficient driving point through a multi-stage transmission to ultimately improve fuel efficiency.

In addition, the multi-stage transmission as described above may allow the engine to be driven in a relatively low revolution per minute (RPM) band to further improve silence of the vehicle.

However, as shifting stages of the transmission are increased, the number of internal components configuring the transmission is increased, such that a mounting feature and transfer efficiency may be deteriorated and a cost and a weight may be increased. Therefore, in order to maximize a fuel efficiency improving effect through the multi-stage transmission, it is important to devise a transmission structure capable of deriving maximum efficiency by a small number of components and a comparatively straightforward configuration.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art. The present disclosure is intended to propose a multi-stage transmission for a vehicle, in which ten forward gear ratios and one reverse gear ratio are realized with a small number of components and a comparatively straightforward configuration, whereby it is possible to maximize fuel efficiency by allowing an engine to be driven at an optimal driving point and is possible to improve silence of the vehicle during driving.

In order to achieve the above object, according to one aspect of the present disclosure, there is provided a multi-stage transmission for a vehicle, the multi-stage transmission including: an input shaft and an output shaft; a first planetary gear set, a second planetary gear set, a third planetary gear set, and a fourth planetary gear set provided between the input shaft and the output shaft to transfer a torque, each of the first to fourth planetary gear sets including three rotating elements; and six shifting elements connected to the rotating elements of the first, second, third and fourth planetary gear sets, wherein a first rotating element of the first planetary gear set is fixedly connected to a first rotating element of the second planetary gear set, a second rotating element of the first planetary gear set is fixedly connected to a first rotating element of the third planetary gear set, and a third rotating element of the first planetary gear set is fixedly connected to a third rotating element of the fourth planetary gear set; a second rotating element of the second planetary gear set is fixedly connected to both a second rotating element of the third planetary gear set and a second rotating element of the fourth planetary gear set; and a third rotating element of the third planetary gear set is fixedly connected to the output shaft.

The first rotating element of the first planetary gear set may be selectively connected to the second rotating element of the first planetary gear set and may be fixedly connected to a transmission casing by one element of the six shifting elements, the second rotating element of the first planetary gear set may be selectively connected to the input shaft, and the third rotating element of the first planetary gear set may be selectively connected to the second rotating element of the fourth planetary gear set; a third rotating element of the second planetary gear set may be fixedly connected to the transmission casing by another element of the six shifting elements; and a first rotating element of the fourth planetary gear set may be selectively connected to the input shaft.

The first planetary gear set, the second planetary gear set, the third planetary gear set, and the fourth planetary gear set may be sequentially arranged in an axial direction from the input shaft toward the output shaft.

The first rotating element of the first planetary gear set may be fixedly connected to the transmission casing by a first brake of the six shifting elements; and the third rotating element of the second planetary gear set may be fixedly connected to the transmission casing by a second brake of the six shifting elements.

The second rotating element of the first planetary gear set and the input shaft may be selectively connected to each other by a first clutch of the six shifting elements; the first rotating element of the fourth planetary gear set and the input shaft may be selectively connected to each other by a second clutch of the six shifting elements; the first rotating element of the first planetary gear set and the second rotating element of the first planetary gear set may be selectively connected to each other by a third clutch of the six shifting elements; and the third rotating element of the first planetary gear set and the second rotating element of the fourth planetary gear set may be selectively connected to each other by a fourth clutch of the six shifting elements.

According to another aspect of the present disclosure, there is provided a multi-stage transmission for a vehicle, the multi-stage transmission including: a first planetary gear set, a second planetary gear set, a third planetary gear set, and a fourth planetary gear set, each including three rotating elements; six shifting elements configured to selectively connect rotation shafts thereto; and eight rotation shafts connected to the rotating elements of the first, second, third and fourth planetary gear sets, wherein a first rotation shaft is an input shaft, a second rotation shaft is fixedly connected to a first rotating element of the first planetary gear set and a first rotating element of the second planetary gear set, a third rotation shaft is fixedly connected to a second rotating element of the first planetary gear set and a first rotating element of the third planetary gear set, a fourth rotation shaft is fixedly connected to a third rotating element of the first planetary gear set and a third rotating element of the fourth planetary gear set, a fifth rotation shaft is fixedly connected to a third rotating element of the second planetary gear set, a sixth rotation shaft is fixedly connected to a second rotating element of the second planetary gear set, a second rotating element of the third planetary gear set, and a second rotating element of the fourth planetary gear set, a seventh rotation shaft is fixedly connected to a first rotating element of the fourth planetary gear set, and an eighth rotation shaft is an output shaft fixedly connected to a third rotating element of the third planetary gear set.

Of the six shifting elements, a first brake may be provided between the second rotation shaft and a transmission casing, a second brake may be provided between the fifth rotation shaft and the transmission casing, a first clutch may be provided between the first rotation shaft and the third rotation shaft, a second clutch may be provided between the first rotation shaft and the seventh rotation shaft, a third clutch may be provided between the second rotation shaft and the third rotation shaft, and a fourth clutch may be provided between the fourth rotation shaft and the sixth rotation shaft.

According to the multi-stage transmission for a vehicle configured as described above, ten forward gear ratios and one reverse gear ratio are realized with a small number of components and a comparatively straightforward configuration, whereby it is possible to maximize fuel efficiency by allowing an engine to be driven at an optimal driving point and to improve silence of the vehicle during driving.

BRIEF DESCRIPTION OF THE DRAWINGS

The above and other objects, features and other advantages of the present disclosure will be more clearly understood from the following detailed description when taken in conjunction with the accompanying drawings, in which:

FIG. 2 is an operation mode table showing that each gear step is implemented by the multi-stage transmission of FIG. 1.

DETAILED DESCRIPTION OF THE DISCLOSURE

Figure 1:
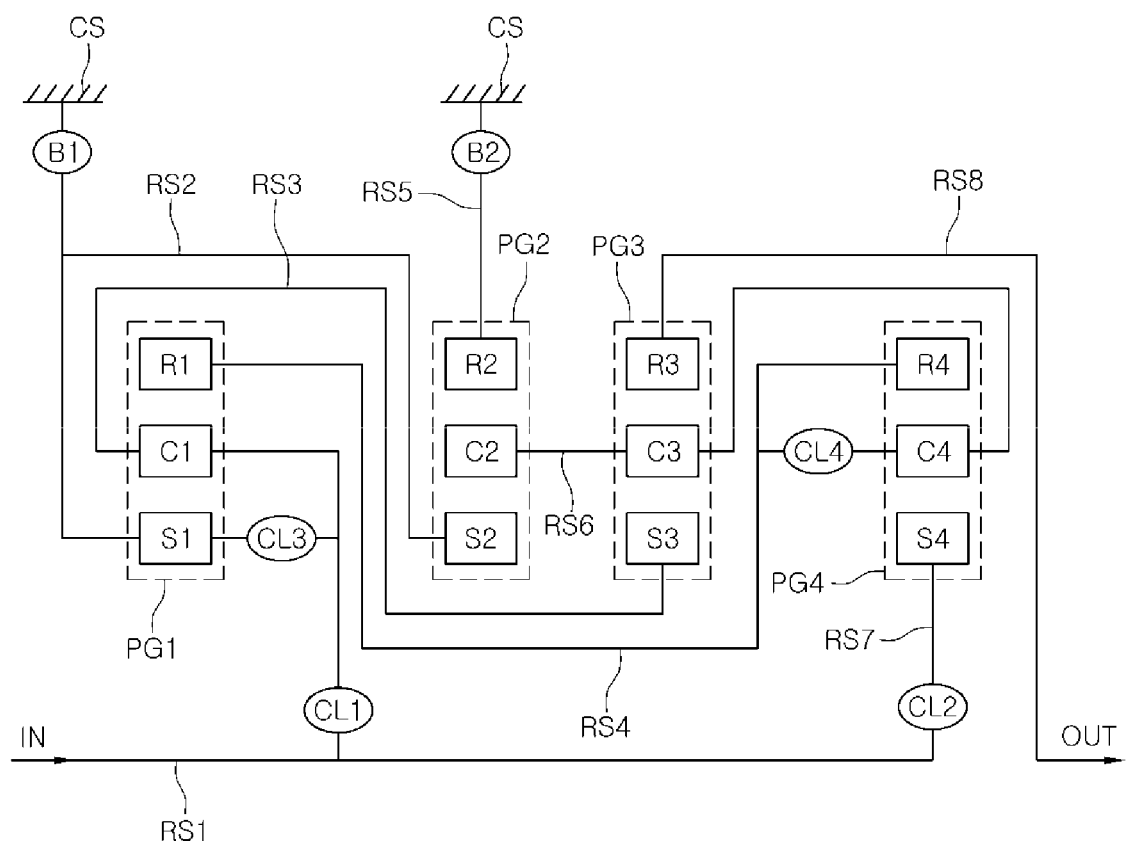
FIG. 1 is a diagram showing a multi-stage transmission for a vehicle according to the present disclosure.

Hereinbelow, a multi-stage transmission for a vehicle according to an exemplary embodiment of the present disclosure will be described in detail with reference to the accompanying drawings.

Referring to FIG. 1, a multi-stage transmission for a vehicle of the present disclosure includes: an input shaft IN and an output shaft OUT; a first planetary gear set PG1, a second planetary gear set PG2, a third planetary gear set PG3, and a fourth planetary gear set PG4 provided between the input shaft IN and the output shaft OUT to transfer a torque. Each planetary gear set includes three rotating elements. The transmission further includes six shifting elements connected to the rotating elements of the first, second, third and fourth planetary gear sets.

A first rotating element S1 of the first planetary gear set PG1 is fixedly connected to a first rotating element S2 of the second planetary gear set PG2, is selectively connected to a second rotating element C1 of the first planetary gear set PG1, and is fixedly connected to a transmission casing CS by one element of the six shifting elements. The second rotating element C1 of the first planetary gear set PG1 is fixedly connected to a first rotating element S3 of the third planetary gear set PG3 and is selectively connected to the input shaft IN. A third rotating element R1 of the first planetary gear set PG1 is selectively connected to a second rotating element C4 of the fourth planetary gear set PG4, and is fixedly connected to a third rotating element R4 of the fourth planetary gear set PG4.

A second rotating element C2 of the second planetary gear set PG2 is fixedly connected to both a second rotating element C3 of the third planetary gear set PG3 and the second rotating element C4 of the fourth planetary gear set PG4. A third rotating element R2 of the second planetary gear set PG2 is fixedly connected to the transmission casing CS by another element of the six shifting elements.

A third rotating element R3 of the third planetary gear set PG3 is fixedly connected to the output shaft OUT. A first rotating element S4 of the fourth planetary gear set PG4 is selectively connected to the input shaft IN.

In the embodiment, the first planetary gear set PG1, the second planetary gear set PG2, the third planetary gear set PG3, and the fourth planetary gear set PG4 are sequentially arranged in an axial direction from the input shaft IN toward the output shaft OUT.

The first rotating element S1 of the first planetary gear set PG1 is fixedly connected to the transmission casing CS by a first brake B1 of the six shifting elements. The third rotating element R2 of the second planetary gear set PG2 is fixedly connected to the transmission casing CS by a second brake B2 of the six shifting elements.

In other words, it is possible to fixedly connect the first rotating element S1 of the first planetary gear set PG1 to the transmission casing CS or adjust the same to be freely rotatable with respect to the transmission casing by the first brake B1. The third rotating element R2 of the second planetary gear set PG2 is fixedly connected to or freely rotatably provided in the transmission casing CS by the second brake B2.

The second rotating element C1 of the first planetary gear set PG1 and the input shaft IN are selectively connected to each other by a first clutch CL1 of the six shifting elements. The first rotating element S4 of the fourth planetary gear set PG4 and the input shaft IN are selectively connected to each other by a second clutch CL2 of the six shifting elements. The first rotating element S1 of the first planetary gear set PG1 and the second rotating element C1 of the first planetary gear set PG1 are selectively connected to each other by a third clutch CL3 of the six shifting elements. The third rotating element R1 of the first planetary gear set PG1 and the second rotating element C4 of the fourth planetary gear set PG4 are selectively connected to each other by a fourth clutch CL4 of the six shifting elements.

The first brake B1, the second brake B2, the first clutch CL1, the second clutch CL2, the third clutch CL3, and the fourth clutch CL4 are controlled by a controller (not shown in the drawing) to correspond to the running condition of the vehicle in accordance with an operation mode table such as the table of FIG. 2, whereby it is possible to realize ten forward gear ratios and one reverse gear ratio of the vehicle.

In particular, when the first brake B1, the second brake B2, the first clutch CL1, the second clutch CL2, the third clutch CL3, and the fourth clutch CL4 are collectively referred to as "shifting elements", the transmission of the present disclosure is capable of a so-called clutch-to-clutch shifting, in which shifting is performed by engaging one shifting element while releasing another shifting element at the time of a series of shifting from the first stage to the tenth stage as shown in FIG. 2.

The first rotating element of the first planetary gear set PG1 is constituted by a first sun gear S1, the second rotating element thereof is constituted by a first carrier C1, and the third rotating element thereof is constituted by a first ring gear R1. The first rotating element of the second planetary gear set PG2 is constituted by a second sun gear S2, the second rotating element thereof is constituted by a second carrier C2, and the third rotating element thereof is constituted by a second ring gear R2. The first rotating element of the third planetary gear set PG3 is constituted by a third sun gear S3, the second rotating element thereof is constituted by a third carrier C3, and the third rotating element thereof is constituted by a third ring gear R3. The first rotating element of the fourth planetary gear set PG4 is constituted by a fourth sun gear S4, the second rotating element thereof is constituted by a fourth carrier C4, and the third rotating element thereof is constituted by a fourth ring gear R4.

Further, the multi-stage transmission of the present disclosure configured as described above may be expressed as follows. The multi-stage transmission may include: the first planetary gear set PG1, the second planetary gear set PG2, the third planetary gear set PG3, and the fourth planetary gear set PG4 including three rotating elements; six shifting elements configured to selectively connect rotation shafts thereto; and eight rotation shafts connected to the rotating elements of the first, second, third and fourth planetary gear sets.

Here, a first rotation shaft RS1 is the input shaft IN. A second rotation shaft RS2 is fixedly connected to the first rotating element S1 of the first planetary gear set PG1 and the first rotating element S2 of the second planetary gear set PG2. A third rotation shaft RS3 is fixedly connected to the second rotating element C1 of the first planetary gear set PG1 and the first rotating element S3 of third planetary gear set PG3. A fourth rotation shaft RS4 is fixedly connected to the third rotating element R1 of the first planetary gear set PG1 and the third rotating element R4 of the fourth planetary gear set PG4. A fifth rotation shaft RS5 is fixedly connected to the third rotating element R2 of the second planetary gear set PG2. A sixth rotation shaft RS6 is fixedly connected to the second rotating element C2 of the second planetary gear set PG2, the second rotating element C3 of the third planetary gear set PG3, and the second rotating element C4 of the fourth planetary gear set PG4. A seventh rotation shaft RS7 is fixedly connected to the first rotating element S4 of the fourth planetary gear set PG4. An eighth rotation shaft RS8 is the output shaft OUT fixedly connected to the third rotating element R3 of the third planetary gear set PG3.

Of the six shifting elements, the first brake B1 is provided between the second rotation shaft RS2 and the transmission casing CS. The second brake B2 is provided between the fifth rotation shaft RS5 and the transmission casing CS. The first clutch CL1 is provided between the first rotation shaft RS1 and the third rotation shaft RS3. The second clutch CL2 is provided between the first rotation shaft RS1 and the seventh rotation shaft RS7. The third clutch CL3 is provided between the second rotation shaft RS2 and the third rotation shaft RS3. The fourth clutch CL4 is provided between the fourth rotation shaft RS4 and the sixth rotation shaft RS6.

As described above, the multi-speed transmission of the present disclosure constituted by four simple planetary gear sets and six shifting elements is capable of realizing ten forward gear ratios and one reverse gear ratio according to an operation mode table such as the table of FIG. 2. Multi-stage shifting stages of ten shifting stages are achieved with a relatively small number of components and a straightforward and lightweight configuration, whereby it is possible to improve fuel efficiency by providing a more optimized transmission ratio to the driving situation of the vehicle.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A multi-stage transmission for a vehicle, the multi-stage transmission comprising:
    an input shaft and an output shaft;
    a first planetary gear set, a second planetary gear set, a third planetary gear set, and a fourth planetary gear set provided between the input shaft and the output shaft to transfer a torque, each of the first to fourth planetary gear sets including three rotating elements; and
    six shifting elements connected to the rotating elements of the first, second, third and fourth planetary gear sets,
    wherein a first rotating element of the first planetary gear set is fixedly connected to a first rotating element of the second planetary gear set, a second rotating element of the first planetary gear set is fixedly connected to a first rotating element of the third planetary gear set, and a third rotating element of the first planetary gear set is fixedly connected to a third rotating element of the fourth planetary gear set;
    a second rotating element of the second planetary gear set is fixedly connected to both a second rotating element of the third planetary gear set and a second rotating element of the fourth planetary gear set; and
    a third rotating element of the third planetary gear set is fixedly connected to the output shaft.

2. The multi-stage transmission of claim 1, wherein the first rotating element of the first planetary gear set is selectively connected to the second rotating element of the first planetary gear set and is fixedly connected to a transmission casing by one element of the six shifting elements, the second rotating element of the first planetary gear set is selectively connected to the input shaft, and the third rotating element of the first planetary gear set is selectively connected to the second rotating element of the fourth planetary gear set;
    a third rotating element of the second planetary gear set is fixedly connected to the transmission casing by another element of the six shifting elements; and
    a first rotating element of the fourth planetary gear set is selectively connected to the input shaft.

3. The multi-stage transmission of claim 2, wherein the first rotating element of the first planetary gear set is fixedly connected to the transmission casing by a first brake of the six shifting elements; and
    the third rotating element of the second planetary gear set is fixedly connected to the transmission casing by a second brake of the six shifting elements.

4. The multi-stage transmission of claim 3, wherein the second rotating element of the first planetary gear set and the input shaft are selectively connected to each other by a first clutch of the six shifting elements;

the first rotating element of the fourth planetary gear set and the input shaft are selectively connected to each other by a second clutch of the six shifting elements;

the first rotating element of the first planetary gear set and the second rotating element of the first planetary gear set are selectively connected to each other by a third clutch of the six shifting elements; and the third rotating element of the first planetary gear set and the second rotating element of the fourth planetary gear set are selectively connected to each other by a fourth clutch of the six shifting elements.

5. A multi-stage transmission for a vehicle, the multi-stage transmission comprising:

a first planetary gear set, a second planetary gear set, a third planetary gear set, and a fourth planetary gear set, each including three rotating elements;

six shifting elements configured to selectively connect rotation shafts thereto; and eight rotation shafts connected to the rotating elements of the first, second, third and fourth planetary gear sets, wherein a first rotation shaft is an input shaft, a second rotation shaft is fixedly connected to a first rotating element of the first planetary gear set and a first rotating element of the second planetary gear set, a third rotation shaft is fixedly connected to a second rotating element of the first planetary gear set and a first rotating element of the third planetary gear set, a fourth rotation shaft is fixedly connected to a third rotating element of the first planetary gear set and a third rotating element of the fourth planetary gear set, a fifth rotation shaft is fixedly connected to a third rotating element of the second planetary gear set, a sixth rotation shaft is fixedly connected to a second rotating element of the second planetary gear set, a second rotating element of the third planetary gear set, and a second rotating element of the fourth planetary gear set, a seventh rotation shaft is fixedly connected to a first rotating element of the fourth planetary gear set, and an eighth rotation shaft is an output shaft fixedly connected to a third rotating element of the third planetary gear set.

6. The multi-stage transmission of claim 5, wherein of the six shifting elements, a first brake is provided between the second rotation shaft and a transmission casing, a second brake is provided between the fifth rotation shaft and the transmission casing, a first clutch is provided between the first rotation shaft and the third rotation shaft, a second clutch is provided between the first rotation shaft and the seventh rotation shaft, a third clutch is provided between the second rotation shaft and the third rotation shaft, and a fourth clutch is provided between the fourth rotation shaft and the sixth rotation shaft.

\* \* \* \* \*